(12) United States Patent
Hamdi

(10) Patent No.: US 7,133,442 B2
(45) Date of Patent: Nov. 7, 2006

(54) RAPID IDENTIFICATION OF TRANSMISSION MEDIA CHANNEL CHARACTERISTICS

(75) Inventor: Rabah S. Hamdi, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 685 days.

(21) Appl. No.: 09/821,410

(22) Filed: Mar. 29, 2001

(65) Prior Publication Data

US 2002/0181567 A1 Dec. 5, 2002

(51) Int. Cl.
H04B 1/38 (2006.01)
H04B 3/20 (2006.01)
H04M 9/08 (2006.01)

(52) U.S. Cl. ............ 375/222; 375/231; 370/290; 370/292; 379/406.1

(58) Field of Classification Search .......... 375/229, 375/231, 232, 254, 285, 346, 348, 350, 219, 375/222, 257; 370/290, 292; 379/406.08, 379/406.09, 406.1; 708/323
See application file for complete search history.

(56) References Cited

U.S. PATENT DOCUMENTS

| | | | | |
|---|---|---|---|---|
| 5,263,033 A | * | 11/1993 | Seshadri | 714/792 |
| 5,675,612 A | * | 10/1997 | Solve et al. | 375/326 |
| 5,742,642 A | * | 4/1998 | Fertner | 375/233 |
| 5,862,156 A | * | 1/1999 | Huszar et al. | 714/795 |
| 6,118,814 A | * | 9/2000 | Friedman | 375/232 |
| 6,320,901 B1 | * | 11/2001 | Arad et al. | 375/222 |
| 6,466,616 B1 | * | 10/2002 | Stenstrom et al. | 375/233 |
| 6,504,884 B1 | * | 1/2003 | Zvonar | 375/346 |
| 6,603,811 B1 | * | 8/2003 | Dobson et al. | 375/232 |
| 6,928,107 B1 | * | 8/2005 | Olafsson et al. | 375/219 |
| 2002/0154688 A1 | * | 10/2002 | Pollmann et al. | 375/229 |

OTHER PUBLICATIONS

Turner, Steven E., *Echo Cancellation for High-Speed Dial-Up Applications: Part I*, Telecommunications Magazine, pp. 80, 83, 85-86, and 104 (1988).

Douglas, Jack, *V.32 modems are breaking through the echo barrier*, Data Communications Magazine, pp. 187-194 (Apr. 1988).

G. Long, and F. Ling, *Fast Initialization of Data-Driven Nyquist In-Band Echo Cancellers*, IEEE Transactions on Communications, vol. 41, No. 6, pp. 1 and 893-904 (Jun. 1993).

P. Chevillat, D. Maiwald, and G. Underboeck, *Rapid Training of a Voiceband Data-Modem Receiver for Employing an Equalizer with Fractional-T Spaced Coefficients*, IEEE Transactions on Communications, vol. COM-35, No. 9, pp. 869-876 (Nov. 1987).

(Continued)

Primary Examiner—Young T. Tse

(57) ABSTRACT

Rapid identification and modeling of transmission media channel characteristics of a communications system using a correlation based technique. The technique provides a known training sequence used to generate a known quantity that operates on an observed or measured received signal, which is a function of the training sequence and the channel's impulse response, to give an estimate of the model of the channel. The technique decouples the training sequence from the observed or measured output, leaving the estimated impulse response. The impulse response of the transmission media channel is rapidly computed and processed to set the initial values of filter coefficients, for example, an echo canceller and an equalizer, in the communications system. Once the coefficients are initialized, if needed, a standard technique, such as least mean square (LMS) correlation, can be used to fine-tune the coefficients to converge on or model the transmission media channel's characteristics.

43 Claims, 2 Drawing Sheets

OTHER PUBLICATIONS

J. Wang, and J. Werner, *Performance Analysis of an Echo-Cancellation Arrangement that Compensates for Frequency Offset in the Far Echo*, IEEE Transactions on Communications, vol. 36, No. 3, pp. 364-372 (Mar. 1988).

F. Ling, and G. Long, *Correlation-based fast training of data-driven Nyquist in-band echo cancellers*, IEEE International Conference on Communications, Conference Record, vol. 4 of 4, pp. 1280-1284 (©1990).

Turner, Steven E., *Echo Cancellation for High-Speed Dial-Up Applications: Part I*, Information Access Company, Section: No. 1, vol. 22; p. 80; 4 pages, (Jan. 1988).

Turner, Steven E., *Echo Cancellation for High-Speed Dial-Up Applications: Part II*, Data Communications Magazine, pp. 83-87 and 96 (Feb. 1988).

O. Macchi and K. Park, *An Echo Canceller with Controlled Power for Frequency Offset Correction*, IEEE Transactions on Communications, vol. COM-34, No. 4, pp. 408-411 (Apr. 1986).

T. Quatieri and G. O'Leary, *Far-Echo Cancellation in the Presence of Frequency Offset*, IEEE Transactions on Communications, vol. 37, No. 6, pp. 635-644 (Jun. 1989).

\* cited by examiner

RAPID IDENTIFICATION OF TRANSMISSION MEDIA CHANNEL CHARACTERISTICS

CROSS-REFERENCE TO RELATED APPLICATIONS

None.

STATEMENTS REGARDING FEDERALLY SPONSORED RESEARCH OR DEVELOPMENT

None.

REFERENCE TO A MICROFICHE APPENDIX

None.

BACKGROUND OF THE INVENTION

1. Field of the Invention

The present invention generally relates to reducing noise and interference between electronic communication devices that utilize the same transmission media for communications. More particularly, the invention relates to estimating or modeling transmission media channel characteristics in a networking or other communications system by creating a model of the impulse response that can be processed to reduce noise and interference between network or other communications devices coupled to the same transmission media.

2. Description of the Related Art

Signal processing techniques using filters, such as echo cancellers and channel equalizers, are important for communications system operation. Echoes can interfere with data transmission and degrade communications system performance. Echoes are transmission channel impairments that result from signals reflected at points in the transmission media where impedances are not matched. Echoes can be produced in hybrids in telephone lines or in modems. A hybrid is a special circuit disposed between two-wire circuits and four-wire circuits in telephone line connections. When used in a modem, a hybrid permits the transmitter and the receiver to be connected at the same time to the telephone line.

When a transmitted signal flows through a network, such as the telephone network, an echo canceller can model the echo path from the echo that is created. Typically, the echo canceller is a type of tapped-delay-line, an adaptive finite impulse response (FIR) filter. It is adaptive because the channel to be modeled is unknown and can change during the course of communications. Echo cancellers can be located within or at the ends of a communications network. They operate to cancel echoes by estimating a replica of the real or true echo and then subtracting that estimate from signals containing the real echo. Typically, an incoming or received signal is a combination of the real echo and the desired true or real signal that has been impaired by noise and other channel distortions. The received signal is input to summation circuitry, where the echo replica is subtracted from the real echo imbedded with the true signal, leaving the desired signal with impairments other than echoes to be passed. Echo cancellers can be implemented as passband or baseband circuits.

Inherent in an echo is a time delay. Accurate detection of the echo time delay must be made for proper echo cancellation. This is accomplished by use of training signals, which are sent out during a training period by the modem to detect the presence, characteristics, and delay of an echo. The training of an echo canceller involves replicating the echoes, as indicated above. For far-end echoes, the modem must be able to cancel out the effects of any transmission media channel impairments that have affected the echo as it passed through the communications system. Such impairments include noise, frequency translation, envelope distortion, and attenuation distortion. For this purpose, channel equalizers are employed, and the echo canceller's adaptive tapped delay line and its tap update registers must be accurate. The tap delay line must be long enough to span the echo, and the modem's tap update register must be precise enough to properly discriminate for echo cancellation. The modem must also produce effective equalization signals in the presence of channel impairments. Other types of modems that use frequency division multiplexing rather than echo cancellation may not be as affected by such impairments.

The process of replicating the echo involves setting initial coefficients or tap weights of the echo canceller and using an error signal to update or adjust the echo canceller coefficients, as will be appreciated by those skilled in the art. As training occurs, the echo canceller filter coefficients are updated. The better the update, the more accurately the true echo will be replicated for proper cancellation. Updating changes (i.e., reduces) the error signal so that the echo canceller coefficients converge rapidly on the proper values to replicate the true echo value. The idea is to use as few taps as possible to accurately estimate the true echo. The length of the channel's impulse response in the time domain determines the number of coefficients (or tap weights). More specifically, the number of coefficients must be enough to span the length of the channel's impulse response. The coefficients are generated at the baud rate of the communications system.

The estimate of the echo path response has to be accurate enough before useful data transmission can start. With the typical least-mean-square (LMS) technique used during initialization training, data are sent out and an LMS adaptation algorithm is run to obtain the proper coefficients for the echo canceller. However, because of the slow convergence speed of the LMS technique, a long training period of a few thousands of data symbol intervals is usually required to obtain a reasonable level of echo cancellation. In LMS, the training sequences are used in a correlation process, and the technique requires higher computational capabilities. More information can be obtained on the LMS technique in S. B. Weinstein, *A Passband Data-Driven Echo Canceller for Full-Duplex Transmission on Two-Wire Circuits*, IEEE TRANSACTIONS ON COMMUNICATIONS, Vol. Com-25 (July 1977), which is hereby incorporated by reference in its entirety. Another technique is to use discrete Fourier transform (DFT). Other techniques for echo cancellation of near-end and far-end echoes include sending a special periodic training sequence and correlating a portion of the sequence with real echo samples. This technique is disclosed, for example, in Guozhu Long and Fuyun Ling, *Fast Initialization of Data-Driven Nyquist N-Band Echo Cancellers*, IEEE TRANSACTIONS ON COMMUNICATIONS, Vol. 41, No. 6 (June 1993), which is hereby incorporated by reference in its entirety.

Further information on echo cancellers, modems, and hybrids can be found in Jack Douglas, V.32 *Modems are Breaking Through the Echo Barrier*, DATA COMMUNICATIONS (April 1988), Steven E. Turner, *Echo Cancellation for High-Speed Dial-Up Applications: Part I*, TELECOMMUNICATIONS (January 1988), Steven E. Turner, *Echo Cancellation for High-Speed Dial-Up Applications: Part II*, TELECOMMU- NICATIONS (February 1988), Jin-Der Wang and Jean-Jacques Werner, *Performance Analysis of an Echo-Cancellation Arrangement that Compensates for Frequency Offset in the Far Echo*, IEEE TRANSACTIONS ON COMMUNICATIONS, Vol. 36, No. 3 (March 1998), and in Fuyun Ling and Guozhu Long, *Correlation-Based Fast Training of Data-Driven Nyquist N-Band Echo Cancellers,* IEEE INT'L CONFERENCE ON CCOMMUNICATIONS (ICC '90 and SUPERCOMM/ICC '90) vol. 4, (April 1990), which are hereby incorporated by reference herein in their entireties.

In communications systems, for example, for voice band data-modems that employ channel equalizers to remove channel impairments other than echoes, it is important that the initial training be fast as well. The equalizer is a filter like the echo canceller and also has coefficients or taps that must be estimated and updated (i.e., properly weighted) based on characterization of the transmission media channel. The equalizer must be trained to compensate for phase, amplitude, and distortion impairments imposed by the transmission channel.

Sequences of signals are used for training both echo cancellers and channel equalizers. Such sequences are wideband pseudo random periodic time domain signals. For equalizers, the period is equal to the length of the equalizer delay line. A sequence that has complex symbols having constant amplitude facilitates gain control, and if the spectrum of the training signal has lines of equal amplitude, then such combination of characteristics are termed constant amplitude zero auto correlation (CAZAC) sequences. Such sequences can be designed for the length of the particular equalizer. Although the equalizer must be trained much like the echo canceller, its role is to remove transmission media channel impairments other than echoes, as discussed above. Typically, the channel equalizer follows the echo canceller in the received signal path for processing the received signal. Further information on equalizers can be found in Pierre R. Chevillat, Dietrich Maiwald, and Gottfried Ungerboeck, *Rapid Trading of a Voiceband Data-Modem Receiver Employing an Equalizer with Fractional-T Spaced Coefficients,* IEEE TRANSACTIONS ON COMMUNICATIONS, Vol. Com-35, No. 9 (September 1987), which is hereby incorporated by reference herein in its entirety.

SUMMARY OF THE INVENTION

Embodiments of the present invention provide a method of rapid identification of transmission media channel characteristics. The method includes generating a training sequence, transmitting the training sequence as an input to the transmission media channel, obtaining an output quantity (e.g., an observed or measured output) that is a function of the transmitted training sequence and an impulse response of the channel. The method also includes computing a known quantity (e.g., a matrix) from the training sequence, computing an impulse response model of the transmission media channel using the known quantity and the output quantity, and using the impulse response model to remove impairments imposed by the transmission media channel on the signals received. Impairments can include amplitude attenuation, phase shifts, and distortion by the transmission media channel, as well as echoes.

Embodiments of the present Invention also include generating a training signal sequence and transmitting the training signal sequence over a transmission media channel to generate an observed or measured output signal. A minimized difference value between the observed or measured output signal of the channel and a signal value representation of convolution of the training signal sequence and the unknown impulse response of the channel, together with the training signal sequence, and the observed or measured output signal are used to compute an initial impulse response of the channel. Further refinements or fine-tuning of the impulse response then can be done using other known convergence techniques.

The present invention compensates for or reduces the effects of channel impairments in a communications system. To do this, the present invention estimates or identifies the transmission media channel's characteristics. The technique can be used with modems or other communications systems, and is applicable for a variety of communications or other protocols used in such systems. The technique provides a unique way to decouple the known transmitted signal from the observed received output that contains the known signal and the channel's impulse response. It can be applied for use with an echo canceller and an equalizer to undo the effects of channel impairments and to cancel system echoes. Once the channel impairments and echoes initially are estimated, on receipt of an information- or data-containing signal, the receiving system (e.g., a modem) can reduce or eliminate the effects of these impairments and noise.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Communications networks, systems, and services can be composed of a variety of components having different electrical and physical characteristics. For example, customer in-premises and business telephone wiring can vary, as can the distance between telephone jacks. Connections can vary in a variety of ways and topologies. Configurations of such wiring and other communications network, system, or service components can impose severe signal degradation.

Performance degradation also can result from reflection and echo of signals, resulting from telephone jacks and other components that are not terminated properly (e.g., not impedance matched). This may produce frequency notches that fall in the operating frequency band. The locations of these notches may vary and are directly related to the distance between the communications devices and the jack, the impedance characteristics of these devices, other components of the communications system, and the transmission media. To facilitate and improve system performance, the present invention provides a technique to speed up the process of compensating for such notches and other transmission media channel impairments in the communications device's receiver. The present invention does this by rapid modeling of the channel's impulse response and rapid convergence. For example, the number of symbols or bauds needed for rapid convergence should be at least the number of filter coefficients at the baud rate. It can be used in initializing the echo canceller and the channel equalizer filter coefficients for certain applications. These filters can be implemented in various embodiments, including in hardware circuitry, or as programmed software that runs on a processor (e.g., a digital signal processor (DSP) or other computer processor) in the communications system (e.g., in a modem or computer connected to the modem), or as a combination of such hardware circuitry and software. These embodiments are included within the scope and spirit of the present invention.

Figures 1, 2, 3:
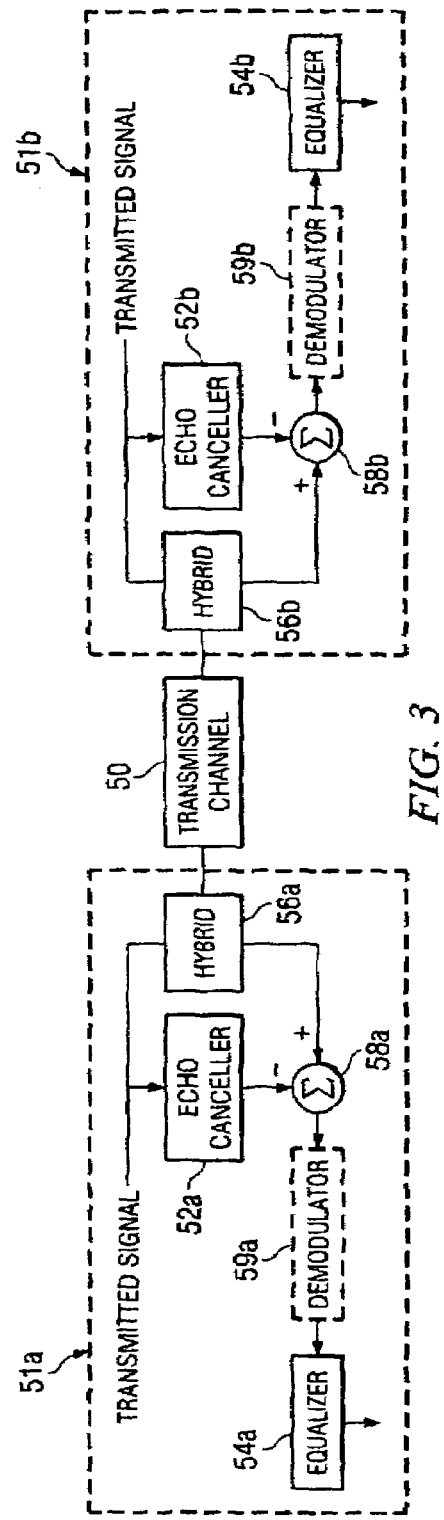
FIG. 1 shows a block diagram of a communications system having a known time domain sequence as an input to a transmission media channel in accordance with an embodiment of the invention.
FIG. 2 shows a block diagram of a communications system in accordance with an embodiment of the invention.
FIG. 3 shows a block diagram of a communications system in accordance with an embodiment of the invention.

In accordance with an embodiment of the invention, a correlation based technique for rapidly identifying (i.e., estimating or determining) the impulse response of a transmission media channel is provided. The identification is used for rapid initial training of an echo canceller and a channel equalizer after which other known techniques can be used for further training, as will be described below. The technique of the present invention works as follows. Assume a known time domain sequence $$x=[x_0,x_1,\ldots,x_{T-1}]$$

is an input to a transmission media channel 10 as a training sequence, as shown in FIG. 1. The sequence can be a series of wide-band pseudo-random time domain signals of length T, as will be appreciated by those skilled in the art. The transmission channel 10 in FIG. 1 has an unknown impulse response h(n), for n=0 to N−1, and y(k) is the observed or measured output for k=0 to T−(N+1), where N is the number of coefficients of the impulse response h to be determined. Then, the output of the transmission channel 10 can be expressed as $$y_k = \sum_{n=0}^{N-1} h_n x_{k+n} + g_k, \qquad (1)$$

where $g_k$ is a signal noise component. Mathematically, Equation (1) is the convolution of the transmission channel's unknown impulse response h and the known input sequence x. Equation (1) can also be represented in matrix notation as $$Y=XH+G, \qquad (2)$$

where X is a matrix with elements $$X_{[k][N]}=X_{k+n}$$

For certain applications, it is reasonable to neglect the noise component because its effects are not as severe as the channel impairments on the received signal. Doing so and letting E be the squared error vector of the difference between the actually observed or measured channel output Y (which is a function of the actual h and x), and an output signal value representation XH, the error vector E can be expressed as $$\begin{aligned} E &= |Y - XH|^2 \\ &= (Y - XH)(\overline{Y - XH}) \\ &= Y\overline{Y} - Y(\overline{XH}) - (XH)\overline{Y} + (XH)(\overline{XH}) \\ &= Y\overline{Y} + \overline{HX}XH - \overline{Y}(XH) - (\overline{HX})Y, \end{aligned} \qquad (4)$$

where the "bar" over a term indicates the Hermetian of that matrix or vector. To minimize the squared error, the partial derivative of the error vector E with respect to H is equated with zero, as $$\frac{\partial E}{\partial h_n} = 2\overline{X}XH - 2\overline{X}Y = 0. \qquad (5)$$

Equation (5) can be rearranged as $$2\overline{X}XH = 2\overline{X}Y$$

or $$H=(\overline{X}X)^{-1}\overline{X}Y,$$

where $$(\overline{X}X)^{-1}$$

is a square symmetric matrix. Setting $$M=(\overline{X}X)^{-1}\overline{X} \qquad (6)$$

gives $$H=MY. \qquad (7)$$

Thus, the impulse response of the transmission media channel can be expressed as a product of the matrix M, which depends solely on the known input training sequence X, and the observed or measured output vector Y. In other words, the matrix M operates on the vector Y to give the channel's impulse response. As will be appreciated by those skilled in the art, if the length of the input sequence x is T and the length of the channel impulse response is N (i.e., N is the number of coefficients needed to span the length of the channel's impulse response), then M is a (T−N)×N matrix and $(\overline{X}X)^{-1}$ is an N×N square symmetric matrix.

As T represents the full bandwidth of the transmission channel, the sequence x of length T should be chosen with care because of computational complexity. The matrix M can be computed off-line and stored, as will be described below, because it can be computationally intensive, and because of possible time limitations. The computation of M can be done from the known input training sequence, for example, in hardware or software or using a combination of both, such as in a DSP or other processor (e.g., system processor) in a computer system coupled to a communications system (e.g., a modem), or in a DSP or other processor in the modem itself, or remotely, or the like. The matrix M could be stored, for example, in the computer system, or in a memory or buffer in the modem, or remotely, for use with the communications system being characterized. Once the vector Y is known, the simple multiplication according to Equation (7) is carried out to give the estimated channel impulse response H. The initially estimated impulse response can then be used to initialize a filter or filters, such as an echo canceller and a channel equalizer. It is possible that the initial estimate will be enough to fully converge the filter or filters to the actual impulse response. However, if further fine-tuning of the estimate is needed, then other slower "adaptive" convergence routines can be used for full convergence of the filter or filters to the actual channel impulse response. Once full convergence is achieved, echoes and the other channel impairments effectively are removed from real received information- or data-containing signals. The other known routines include, for example, least mean square (LMS) correlation. According to the invention, the calculated channel impulse response is a very good and rapid initial estimate of the actual channel impulse response.

As an example, consider a known training sequence of length T=96, $$x(n)=x(0),x(1), \ldots, x(95)$$

If the length of the channel's impulse response can be represented with N=64 coefficients, then the observed or measured channel output vector will be $$Y_n = \begin{bmatrix} y_0 \\ y_1 \\ \vdots \\ y_{31} \end{bmatrix}_{32 \times 1}.$$

Decoupling the training sequence x and the impulse response h, the impulse response thus can be determined as $$[H]_{64 \times 1} = [M]_{64 \times 32} [Y]_{32 \times 1}$$

or $$\begin{bmatrix} h_0 \\ h_1 \\ \vdots \\ h_{63} \end{bmatrix}_{64 \times 1} = \begin{bmatrix} m_{0,0} & m_{1,0} & \cdots & m_{31,0} \\ m_{0,1} & m_{1,1} & & m_{31,1} \\ \vdots & \vdots & & \vdots \\ m_{0,63} & \cdots & \cdots & m_{31,63} \end{bmatrix}_{64 \times 32} \begin{bmatrix} y_0 \\ y_1 \\ \vdots \\ y_{31} \end{bmatrix}_{32 \times 1}.$$

In this example, the Y vector consists of 32×1 observed or measured output signals, the matrix M consists of 64×32 known elements, and the impulse response H consists of 64×1 calculated elements or coefficients. As discuss above, the matrix M can be computed off-line so that there are no system constraints on this. To carry out the matrix multiplication, there may need to be consideration for system resources in terms of memory and system processor or CPU utilization.

Once convergence has occurred, the echo canceller uses the coefficients of the impulse response to remove echo effects in received signals and the equalizer uses them to undo the effects of channel amplitude attenuation, distortion, phase shifts, notches, or other transmission media channel impairments. These coefficients amount to weights given to tapped data for filters like echo cancellers and equalizers. The operations and functions of echo cancellers and equalizers are well known in the art.

The process of initialization according to the present invention includes the following. When a training sequence is transmitted to train a communications device (e.g., a modem), there is a limited time to estimate or identify the channel's impulse response. After the channel has been identified, and the tap weights on the echo canceller and the equalizer have been initially set, then fine-tuning or updating can be accomplished, if needed, for example, using the other slower convergence techniques, such as LMS, in the steady-state mode. In this mode, there is enough time to fine tune the impulse response coefficients that were initially rapidly determined using the techniques of the present invention before actual information content (e.g., data) signals are transmitted (or received).

When transmitting in a communications system having an echo canceller, the echo canceller is initially trained or adapted with the local transmitter active and the distant transmitter inactive. The intent is to provide a very close initial model of both the near-end and the far-end echoes that are present at the receiver (e.g., at the modem). The estimated echo is subtracted from the received signal before a de-modulator processes the received signal. Therefore, only the desired information content signal from the far-end transmitter is demodulated. In this way, the present invention provides the initial settings of the echo canceller for converging on the true echo to be cancelled. The resulting difference signal or error signal e(n) is then used to update the coefficients or tap weights adaptively in the echo canceller using other known techniques.

In operation, the echo canceller generates a replica $\hat{y}(n)$ of the true echo signal received, starting from the initial settings according to the present invention and further refinement using the other techniques. The echo canceller coefficients are adjusted by comparing the echo canceller's output to the received echo signal and forcing the coefficients or taps to mimic the true echo. As a result, the difference between the true echo and the echo canceller's estimate or replica of the echo approaches zero. Thus, the echo canceller models (converges on) the echo path within the network with increasing accuracy. This is the procedure by which the echo's reflection off the local hybrid and the remote hybrid is estimated.

FIG. 2 shows a block diagram of an exemplary communications system in which the present invention can be implemented. In FIG. 2, a communications system (A) 20 can transmit and receive signals through a transmission media channel 22 to and from a communications system (B) 24 and vice versa. The communications systems 20 and 24 can be computer modems, cable modems, satellite modems, or other modems, DSL modems, network adapters, and the like, or other communications systems, even those operating with different protocols. The transmission media channel can be telephone wiring, free space, cable or other transmission lines, and the like. Echo cancellers and equalizers within the communications systems 20 and 24 or elsewhere can make use of the techniques of the present invention to implement the rapid initial estimation of the transmission media channel's characteristics, such as its impulse response. The technique can produce an excellent initial model of the transmission channel 22.

FIG. 3 shows a block diagram of an exemplary communications system in which the present invention can be implemented. FIG. 3 can be a more detailed view of the system shown in FIG. 2, for example. The system in FIG. 3 includes a transmission media channel 50 that couples communications systems 51a and 51b. The channel 50 can be telephone wiring, free space, cable or other transmission lines, and the like. The communications systems 51a and 51b include various components, such as echo cancellers 52a and 52b, equalizers 54a and 54b, hybrids 56a and 56b, summation circuitry 58*a* and 58*b,* and other circuitry 59*a* and 59*b,* respectively. The other circuitry 59*a* and 59*b* can be de-modulators and/or other components, as will be appreciated by those skilled in the art. The communications systems 51*a* and 51*b* can be modems, and the hybrids 56*a* and 56*b* can be located in the communications systems 51*a* and 51*b,* as illustrated in FIG. 3, or they can be remote or form part of the transmission media channel 50, as will be appreciated by those skilled in the art. All of the functions of these components can be performed in hardware or equivalently in software, or in a combination or hardware and software, as discussed above, as will be appreciated by those skilled in the art.

Figure 4:
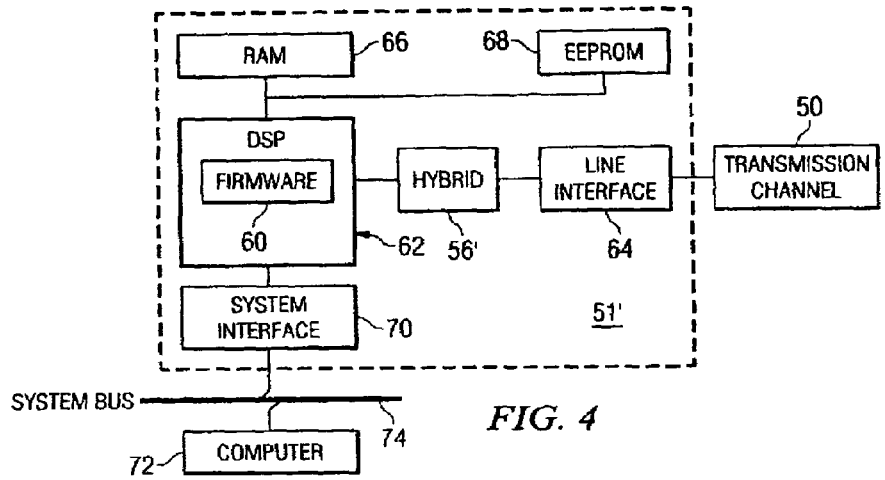
FIG. 4 shows a block diagram of an exemplary communications system in accordance with an embodiment of the invention.

FIG. 4 shows a block diagram of an exemplary implementation of the communications systems 51*a* or 51*b* of FIG. 3 as communications system 51', in accordance with an embodiment of the invention. For clarity in the drawings, not all the components of FIG. 3 are shown in FIG. 4. The communications system 51' includes firmware 60 that includes code for the rapid estimation of the impulse response of the transmission media channel 50 according to the invention. The code contains the filtering function code, for example, for an echo canceller and an equalizer, and can be executed by a DSP 62. The communications system 51' also includes a hybrid 56' (like the hybrids 56*a* or 56*b*) and a line interface 64. The firmware is shown in FIG. 4 as part of the DSP 62 (i.e., on-chip), and is coupled to the transmission media 50 through the hybrid 56' and the line interface 64. In other embodiments, the firmware 60 does not have to be part of the DSP 62. The code for the firmware 60 can be downloaded via RAM 66 from a nonvolatile memory 68, such as an EEPROM, or it can be downloaded directly from the nonvolatile memory 68, in which case there may be no RAM 66, depending on the specific implementation. The communications system 51' is coupled by a system interface 70 to a computer 72 through a computer system bus 74. A user can access the communications system 51' by using the computer 72, as will be appreciated by those skilled in the art. A processor or CPU (not shown) in the computer 72 can execute the code in the firmware 60 in alternative embodiments. In certain embodiments, the RAM 66 and/or the nonvolatile memory 68 can be included in the DSP 62, in which case there may be no need for the firmware 60 as the code could be executed by the DSP 62 directly from the RAM 66 or the nonvolatile memory 68.

Figure 5:
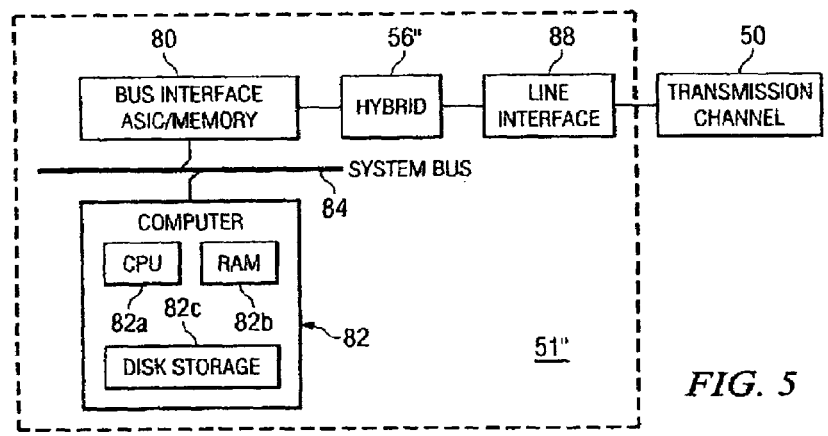
FIG. 5 shows a block diagram of another exemplary communications system in accordance with an embodiment of the invention.

FIG. 5 shows a block diagram of another exemplary implementation of the communications systems 51*a* or 51*b* of FIG. 3 as communications system 51", in accordance with an embodiment of the invention. For clarity in the drawings, not all the components of FIG. 3 are shown in FIG. 5. The communications system 51" in FIG. 5 is hardware implemented, and includes a chip 80 that contains buffers, a system bus interface, and an interface to a hybrid 56" (like the hybrids 56*a* or 56*b*). The chip 80 can be an application specific integrated circuit (ASIC), for example. The chip 80 is coupled to a computer system 82 through a system bus 84. DSP functions are carried out by a CPU 82*a* in the computer system 82. Computer system RAM 82*b* and a computer system disk storage medium 82*c* are coupled to the CPU 82*a*. The code according to the invention can be uploaded to the RAM 82*b* from the disk storage medium 82*c*. The chip 80 is coupled to the transmission media 50 through the hybrid 56" and a line interface 88. The RAM 82*b* receives the received signal data from the transmission media 50. The code is executed on the CPU 82*a* performing the DSP functions using the received signal data for rapid estimation of the impulse response of the transmission media channel 50. A user can access the communications system 51" by using the computer 82, as will be appreciated by those skilled in the art.

Although certain components and arrangements are shown in FIGS. 4 and 5, other embodiments will have more or less components and even different components, in which the present invention can be implemented, as will be appreciated by those skilled in the art. These other embodiments are included within the scope and spirit of the present invention.

Referring again to FIG. 3, when the communications system 51*a* receives signals transmitted by the communications system 51*b,* echo signals also likely will be received back at the communications system 51*a* together with the actual or true signal transmitted from the communications system 51*b*. The echoes can be the near-end and far-end echoes discussed above. The near-end echoes can result from local reflections off the hybrid 56*a* and the far-end echoes from distant reflections off the hybrid 56*b*. These echoes are removed from the received signal by the echo canceller 52*a* (or 52*b* if transmitting in the opposite direction) prior to input to the channel equalizer 52*a* (or 52*b*).

Figure 6:
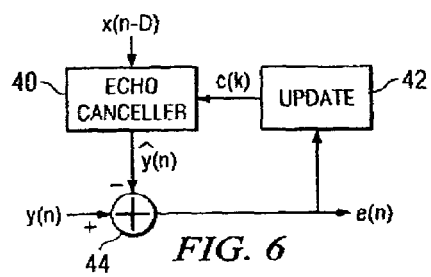
FIG. 6 shows a block diagram of an exemplary echo canceller subsystem of a communications system in accordance with an embodiment of the invention.

As discussed above, to implement the present invention, the input training sequence x(n), in addition to being transmitted, is buffered and delayed, for example, in a buffer memory, before transmission. The buffer memory can be on-chip (e.g., DSP) or system memory or other memory coupled to a computer processor or CPU, as above, as will be appreciated by those skilled in the art. The delay is for synchronization with and removal of the corresponding near-end echo from the local hybrid 56*a*. The input training sequence also is delayed for synchronization with and removal of the corresponding far-end echo from the distant hybrid 56*b* (or 56*a* if transmitting in the opposite direction), for example, using another echo canceller (not shown) like the echo canceller 52*a* (or 52*b*), as will be appreciated by those skilled in the art. The delayed (by D) transmitted signal is illustrated as x(n-D) in FIG. 6, which is received by an echo canceller 40. FIG. 6 shows a block diagram of the echo canceller structure in which the present invention can be implemented. FIG. 6 can be a more detailed view of a portion of the system shown in FIG. 3, for example, and includes summation and update circuitry, which are not shown specifically but nevertheless are included in FIG. 3. The echo canceller 40 is exemplary of the echo cancellers 52*a* and 52*b* in FIG. 3, and as described above.

In FIG. 6, y(n) is the received signal (by the communications system 51*a* in FIG. 3) before the echoes have been removed, ŷ(n) is the replica of the echo, c(k) are the coefficients of the echo canceller 40, and e(n) is the error value. For the echo canceller 40, c(k) equals the estimated impulse response (i.e., c(k)=h(k)). In general, the channel characteristics can vary with time, so that c(k) may need to be updated with time. The received signal y(n) contains the true signal (transmitted by the communications system 51*b* in FIG. 3) as well as the effects of the channel impairments and the echoes that need removal. The estimated echo replica ŷ(n) is subtracted from y(n) at summation circuitry 44, leaving only the effects of the channel impairments other than the echoes on the true transmitted signal. The summation circuitry 44 can be implemented in digital logic or software running on a DSP or computer system processor as in the implementations shown in FIGS. 4 and 5. Thus, the echo canceller 40 can be used to remove the echo of the local transmit hybrid. In FIG. 3, this means that the echo canceller 52*a* can be used to remove the echo from the hybrid 56*a*.

This is also true for the echo canceller 52b and the hybrid 56b in FIG. 3 for transmission in the opposite direction. The transmission characteristics of the echo path thus are replicated from both the near-end and the far-end and subtracted. If needed, two echo cancellers like the echo canceller 40 could use the same technique of the present invention to remove the echo from the local and the remote hybrids, as indicated above. The coefficients c(k) are initially determined according to the present invention and later are updated by other techniques at update circuitry 42, which can be implemented using any of the well known update techniques.

Figure 7:
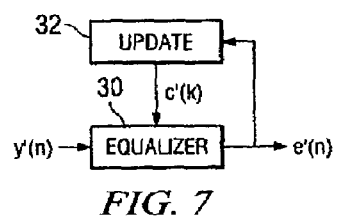
FIG. 7 shows a block diagram of an exemplary equalizer subsystem of a communications system in accordance with an embodiment of the invention.

FIG. 7 shows a block diagram of an equalizer structure in which the present invention can be implemented. FIG. 7 can be a more detailed view of another portion of the system shown in FIG. 3, for example, including update circuitry not shown specifically, but nevertheless included in FIG. 3. The equalizer structure in FIG. 7 includes update circuitry 32, which can be implemented using any of the well known update techniques, as above, and which adaptively updates the coefficients c'(k) of an equalizer 30 using an error signal e'(n). The initial c'(k) values are provided, according to the present invention. For the equalizer 30, the Fourier transform, C'(ω), of the coefficients c'(k) equals the estimated inverse transfer function of the transmission channel (i.e., $$C'(\omega) = \frac{1}{H(\omega)},$$

where H(ω) is the Fourier transform of the estimated impulse response h(k)). In general, the channel characteristics can vary with time, as indicated above, so that c'(k) may need to be updated with time. If needed, updating can be done using LMS or other known slower convergence techniques, as described earlier. Typically, echo cancellation is done before equalization. The received signal y'(n) is the input to the equalizer 30. The equalizer 30 is provided for removing or reducing the remaining transmission media channel impairments. The equalizer 30 coefficients are adjusted and then its output is equalized for gain and phase, thereby undoing the effects of the channel on amplitude and phase. The equalizer 30 in FIG. 7 is exemplary of the equalizers 54a and 54b in FIG. 3, which are shown respectively after the summation circuitry 58a and 58b.

In summary, the present invention provides techniques that can speed up existing techniques for rapid convergence for identifying or estimating the transmission media channel's impulse response. The quickness of the training method is important. The present invention uses a known input sequence x as a training sequence. Depending on the application (e.g., echo canceller, equalizer, or other filter), the same or a different training sequence may be used for estimating the channel's impulse response. The training sequence period should span the full length of the transmission channel. The more periods of the training sequence transmitted, the more accurate the initial estimated impulse response. The number of periods of the training sequence to send out to get proper convergence will depend on the severity of the channel impairments. One period of the input sequence may be sufficient in certain circumstances, for example, where the channel is not severely impaired. The technique is related to convolution of the input sequence with the unknown impulse response of the transmission channel. The impulse response is estimated as a product of the matrix M, which depends on the training sequence x, and the observed or measured output y. The observed or measured output y (or Y matrix) contains the real (actual) channel information. The matrix M is used to operate on the observed or measured signal Y to give the estimate of the impulse response of the channel. The product can give the respective initial coefficients c(k) and c'(k) of an echo canceller and a channel equalizer (or other filter). LMS or other slower techniques that take a longer period of time to accurately converge to (i.e., to model) the channel's impulse response are then used for fine-tuning, if needed.

The disclosure and description of the various embodiments are illustrative and explanatory thereof, and various changes in the signals, sequences, variables, states, hardware, software, and components, as well as in the details of the illustrated circuitry and construction and method of operation may be made without departing from the spirit of the invention.

I claim:

1. A method of rapid identification of characteristics of a transmission media channel, comprising:
   generating training signal sequence of time domain signals $X=[X_0, X_1, \ldots, X_{T-1}]$ of length T;
   transmitting the training signal sequence as an input to the transmission media channel, the transmission media channel having an unknown impulse response $h_{(n)}$, for n=0 to n=N−1, where N is the number of coefficients of the unknown impulse response;
   obtaining an output signal sequence ($Y_k$) of the transmission media channel for k=0 to k=T−(N−1) approximated by
   $Y_k = \Sigma h_n x_{k+n} + g_k$;
   where $g_k$ is a signal noise component;
   computing a reference value from the training signal sequence; and
   using the reference value to operate on the output signal sequence for decoupling the training signal sequence from the output signal sequence for computing an estimate of the impulse response $h_{(n)}$ of the transmission media channel.

2. The method of claim 1, further composing using the estimate of the impulse response of the transmission media channel to remove impairments imposed by the transmission media channel on received signals.

3. The method of claim 1, wherein the training signal sequence comprises a known training signal sequence.

4. The method of claim 1, wherein the computing the estimate of the impulse response of the transmission media channel comprises computing an initial estimate of the impulse response.

5. The method of claim 1, wherein the reference value is computed off-line.

6. The method of claim 1, wherein the reference value comprises a matrix $M=(\overline{X}X)^{-1}\overline{X}$, where X is a known training signal sequence in matrix form, and $\overline{X}$ is the Hermitian of X, and
   computation of the impulse response of the transmission media channel is expressed as H=MY, where Y is the transmission media channel output signal vector.

7. The method of claim 1, wherein the computing the estimate of the impulse response of the transmission media channel is hardware implemented.

8. The method of claim 1, wherein the computing the estimate of the impulse response of the transmission media channel is software implemented.

9. The method of claim 1, further comprising using the estimate of the impulse response of the transmission media channel for removing echoes from signals received from the transmission media channel.

10. The method of claim 1, further comprising using the estimate of the impulse response of the transmission media channel for setting the coefficients of a filter.

11. The method of claim 1, further comprising using the estimate of the impulse response of the transmission media channel for setting the coefficients of an echo canceller.

12. The method of claim 1, further comprising using the estimate of the impulse response of the transmission media channel for setting the coefficients of an equalizer.

13. A method of rapid identification of characteristics of a transmission media channel, comprising:
   generating a known training signal sequence;
   transmitting the training signal sequence over the transmission media channel to generate an observed or measured output signal;
   using a minimized difference value between (a) the observed or measured output signal and (b) a signal value representation of convolution of the training signal sequence and an unknown impulse response of the transmission media channel, to derive a reference value related to the training signal sequence that can be expressed as a matrix $M=(\overline{X}X)^1\overline{X}$, where X is the training signal sequence in matrix form, and $\overline{X}$ is the Hermitian of X; and using the reference value to operate on the observed or measured output signal for decoupling the training signal sequence from the observed or measured output signal expressed as a vector Y for computing an estimated impulse response H of the transmission media channel, expressed as H=MY.

14. The method of claim 13, further comprising computing the matrix M off-line from communications with the transmission media channel.

15. The method of claim 13, further comprising using the estimated impulse response of the transmission media channel to remove impairments imposed by the transmission media channel on received signals.

16. The method of claim 13, further comprising using the estimated impulse response of the transmission media channel for setting the coefficients of a filter.

17. The method of claim 13, further composing using the estimated impulse response of the transmission media channel for setting the coefficients of an echo canceller.

18. The method of claim 13, further comprising using the estimated impulse response of the transmission media channel for setting the coefficients of an equalizer.

19. A system for rapid identification of characteristics of a transmission media channel, comprising:
   a transmission media channel;
   a processor coupled to the transmission media channel, said processor adapted to execute code to:
   generate a known training signal sequence;
   transmit the training signal sequence as an input to the transmission media channel;
   obtain an output signal of the transmission media channel related to the transmitted training signal sequence and an unknown impulse response of the transmission media channel;
   compute a reference value from the training signal sequence by executing the code to compute a matrix $M=(\overline{X}X)^1\overline{X}$ representing the reference value, off-line from the transmission media channel, wherein X is the training signal sequence in matrix form, and $\overline{X}$ is the Hermitian of X; and
   decouple the training signal sequence from the output signal of the transmission media channel, expressed as a vector Y, to compute an estimated impulse response H of the transmission media channel, expressed as H=MY.

20. The system of claim 19, wherein the processor comprises a DSP.

21. The system of claim 20, further comprising a hybrid coupling the DSP to the transmission media channel.

22. The system of claim 19, wherein the processor comprises a CPU of a computer.

23. The system of claim 19, further comprising a modem coupling the processor to the transmission media channel.

24. The system of claim 19, wherein the processor forms part of a communications system.

25. The system of claim 19, wherein the processor forms part of a modem.

26. The system of claim 19, further comprising a hybrid coupling the processor to the transmission media channel.

27. The system of claim 19, wherein the processor is adapted to use the estimated impulse response of the transmission media channel to remove impairments imposed by the transmission media channel on received signals.

28. The system of claim 19, further comprising a fitter adapted to remove transmission media channel impairments from signals received from the transmission media channel using the estimated impulse response of the transmission media channel.

29. The system of claim 28, wherein the filter comprises an echo canceller for removing echo signals.

30. The system of claim 28, wherein the filter comprises an equalizer whose output is equalized for gain and phase.

31. A system for rapid identification of characteristics of a transmission media channel, comprising:
   a processor for executing code for generating a known training signal sequence, the known training signal sequence transmitted as an input to the transmission media channel;
   a communications system coupling the processor to the transmission media channel, the processor executing the code to:
   obtain an observed or measured output signal of the transmission media channel related to the transmitted training signal sequence and an unknown impulse response of the transmission media channel,
   compute from the training signal sequence, a reference value matrix $M=(\overline{X}X)^1\overline{X}$, off-line from the transmission media channel, wherein X is the known training signal sequence, and $\overline{X}$ is the Hermitian of X,
   decouple the training signal sequence from the observed or measured output signal of the transmission media channel, represented as a vector Y, and
   compute an estimated impulse response H of the transmission media channel expressed as H=MY; and
   a disk storage medium for providing the code to the processor.

32. The system of claim 31, wherein the processor comprises a DSP.

33. The system of claim 31, wherein the processor comprises a CPU of a computer.

34. The system of claim 31, further comprising a modem coupling the processor to the transmission media channel.

35. The system of claim 31, wherein the processor forms part of the communications system.

36. The system of claim 31, wherein the processor forms part of a modem.

37. The system of claim 31, further comprising a hybrid coupling the processor to the transmission media channel.

38. The system of claim 31, wherein the estimated impulse response of the transmission media channel is computed in a hardware implementation.

39. The system of claim 31, wherein the estimated impulse response of the transmission media channel is computed in a software implementation.

40. The system of claim 31, wherein the processor is adapted to use the estimated impulse response of the transmission media channel to remove impairments imposed by the transmission media channel on received signals.

41. The system of claim 31, further comprising a filter adapted to remove transmission media channel impairments from signals received from the transmission media channel using the estimated impulse response of the transmission media channel.

42. The system of claim 41, wherein the filter comprises an echo canceller for removing echo signals.

43. The system of claim 41, wherein the filter comprises an equalizer whose output is equalized for gain and phase.

* * * * *

UNITED STATES PATENT AND TRADEMARK OFFICE
CERTIFICATE OF CORRECTION

PATENT NO. : 7,133,442 B2  Page 1 of 1
APPLICATION NO. : 09/821410
DATED : November 7, 2006
INVENTOR(S) : Rabah S. Hamdi It is certified that error appears in the above-identified patent and that said Letters Patent is hereby corrected as shown below:

In column 3, lines 7-8, delete "CCOMMUNICATIONS" and insert -- COMMUNICATIONS --, therefor.

In column 12, line 42, in Claim 2, delete "composing" and insert -- comprising --, therefor.

In column 12, line 56, in Claim 6, delete " $M=(XX)^1 X,$ " and insert -- $M = (\overline{X}X)^{-1}\overline{X},$ --, therefor.

In column 13, line 27, in Claim 13, delete " $M=(XX)^1 X,$ " and insert -- $M = (\overline{X}X)^{-1}\overline{X},$ --, therefor.

In column 13, line 46, in Claim 17, delete "composing" and insert -- comprising --, therefor.

In column 13, line 67, in Claim 19, delete " $M=(XX)^1 X$ " and insert -- $M = (\overline{X}X)^{-1}\overline{X}$ --, therefor.

In column 14, line 15, in Claim 23, delete "modern" and insert -- modem --, therefor.

In column 14, line 28, in Claim 28, delete "fitter" and insert -- filter --, therefor.

In column 14, line 51, in Claim 31, delete " $M=(XX)^1 X,$ " and insert -- $M = (\overline{X}X)^{-1}\overline{X},$ --, therefor.

Signed and Sealed this

Fourteenth Day of September, 2010

David J. Kappos
*Director of the United States Patent and Trademark Office*